United States Patent
Niu et al.

(10) Patent No.: US 10,257,761 B2
(45) Date of Patent: *Apr. 9, 2019

(54) USER EQUIPMENT AND METHOD FOR CELL ASSOCIATION AND BEAMFORMING TRAINING WITH A MMWAVE CAPABLE SMALL CELL

(71) Applicant: Intel Corporation, Santa Clara, CA (US)

(72) Inventors: Huaning Niu, Milpitas, CA (US); Yang Tang, Pleasanton, CA (US); Qian Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/026,803

(22) PCT Filed: Dec. 11, 2014

(86) PCT No.: PCT/US2014/069791
§ 371 (c)(1),
(2) Date: Apr. 1, 2016

(87) PCT Pub. No.: WO2015/089303
PCT Pub. Date: Jun. 18, 2015

(65) Prior Publication Data
US 2016/0249269 A1    Aug. 25, 2016

Related U.S. Application Data

(60) Provisional application No. 61/915,035, filed on Dec. 12, 2013.

(51) Int. Cl.
*H04J 3/06* (2006.01)
*H04W 36/30* (2009.01)
(Continued)

(52) U.S. Cl.
CPC .......... *H04W 36/30* (2013.01); *H04B 17/318* (2015.01); *H04W 24/08* (2013.01);
(Continued)

(58) Field of Classification Search
None
See application file for complete search history.

(56) References Cited

U.S. PATENT DOCUMENTS

2007/0140185 A1   6/2007  Garg et al.
2011/0019694 A1*  1/2011  Kwon ................ H04L 27/2613
                                          370/474
(Continued)

FOREIGN PATENT DOCUMENTS

CN    105900487 A    8/2016
JP    2001051243 A    2/2001
(Continued)

OTHER PUBLICATIONS

"Korean Application Serial No. 2016-7012405, Office Action dated Jan. 12, 2017", W/ translation, 11 pgs.
(Continued)

*Primary Examiner* — Kwang B Yao
*Assistant Examiner* — Juvena W Loo
(74) *Attorney, Agent, or Firm* — Schwegman Lundberg & Woessner, P.A.

(57) ABSTRACT

Embodiments relate to systems, methods, and computer readable media to enable a millimeter wave capable small cell (MCSC) devices to receive a handover of a user equipment from a universal mobile telecommunications system terrestrial radio access node B (eNB.) In particular, systems and methods are described for user equipment (UE) association with a MCSC operating as a booster for an eNB, including identification of and communication on preferred cell sector between the UE and the MCSC.

23 Claims, 9 Drawing Sheets

(51) Int. Cl.
  *H04W 56/00* (2009.01)
  *H04W 36/04* (2009.01)
  *H04B 17/318* (2015.01)
  *H04W 24/08* (2009.01)
  *H04W 36/00* (2009.01)
  *H04W 74/00* (2009.01)

(52) U.S. Cl.
  CPC ... *H04W 36/0061* (2013.01); *H04W 36/0069* (2018.08); *H04W 36/0077* (2013.01); *H04W 36/04* (2013.01); *H04W 56/001* (2013.01); *H04W 56/0045* (2013.01); *H04W 56/0095* (2013.01); *H04W 74/006* (2013.01)

(56) References Cited

U.S. PATENT DOCUMENTS

| | | |
|---|---|---|
| 2011/0286346 A1 | 11/2011 | Barbieri et al. |
| 2012/0082022 A1 | 4/2012 | Damnjanovic et al. |
| 2012/0178454 A1* | 7/2012 | Kim .................. H04W 72/0426 455/436 |
| 2012/0250562 A1 | 10/2012 | Li et al. |
| 2012/0320874 A1 | 12/2012 | Li et al. |
| 2013/0034006 A1 | 2/2013 | Ishii et al. |
| 2013/0088983 A1 | 4/2013 | Pragada et al. |
| 2013/0235851 A1* | 9/2013 | Abu-Surra ............ H04W 56/00 370/336 |
| 2013/0286958 A1* | 10/2013 | Liang ................ H04W 74/0866 370/329 |
| 2013/0308473 A1* | 11/2013 | Sun ...................... H04W 36/30 370/252 |
| 2014/0139372 A1* | 5/2014 | Seol ...................... H04B 7/086 342/367 |
| 2014/0177607 A1* | 6/2014 | Li ...................... H04W 74/0833 370/336 |
| 2014/0293954 A1* | 10/2014 | Horvat .................. H04W 48/16 370/330 |
| 2015/0036658 A1* | 2/2015 | Mochizuki ............ H04W 24/10 370/331 |
| 2015/0049649 A1* | 2/2015 | Zhu ...................... H04W 24/02 370/277 |
| 2015/0181493 A1* | 6/2015 | Park ...................... H04W 36/24 455/436 |
| 2016/0072568 A1* | 3/2016 | Mun ...................... H04L 1/0026 375/267 |
| 2016/0212631 A1* | 7/2016 | Shen ...................... H04W 16/28 |

FOREIGN PATENT DOCUMENTS

| | | |
|---|---|---|
| JP | 2011514058 A | 4/2011 |
| WO | WO-2012066676 A1 | 5/2012 |
| WO | WO-2013037297 A1 | 3/2013 |
| WO | WO-2013040487 A1 | 3/2013 |
| WO | WO-2013086164 A1 | 6/2013 |
| WO | WO-2015089303 A1 | 6/2015 |

OTHER PUBLICATIONS

"Korean Application Serial No. 2016-7012405, Response filed Mar. 10, 2017 to Office Action dated Jan. 12, 2017", w/ claims in English, 36 pgs.

"European Application No. 14869448.2, Extended European Search Report dated Jul. 11, 2017", 7 pgs.

"Japanese Application Serial No. 2016-526295, Office Action dated Jul. 11, 2017", (English Translation), 9 pgs.

"Japanese Application Serial No. 2016-526295, Response filed Oct. 11, 2017 to Office Action dated Jul. 11, 2017", w/ claims in English, 13 pgs.

"International Application Serial No. PCT/US2014/069791, International Search Report dated Mar. 2, 2015", 3 pgs.

"International Application Serial No. PCT/US2014/069791, Written Opinion dated Mar. 2, 2015", 5 pgs.

"International Application Serial No. PCT/US2014/069791, International Preliminary Report on Patentability dated Jun. 23, 2016", 7 pgs.

* cited by examiner

USER EQUIPMENT AND METHOD FOR CELL ASSOCIATION AND BEAMFORMING TRAINING WITH A MMWAVE CAPABLE SMALL CELL

PRIORITY CLAIM

This application is a U.S. National Stage Application under 35 U.S.C. 371 from International Application No. PCT/US2014/069791, filed Dec. 11, 2014, which claims the benefit of priority to U.S. Provisional Patent Application Ser. No. 61/915,035, filed on Dec. 12, 2013, which is incorporated herein by reference in its entirety.

TECHNICAL FIELD

Embodiments pertain to systems, methods, and component devices associated with a millimeter wave capable small cell (MCSC) devices. In particular, systems and methods are described for user equipment (UE) association with a MCSC operating as a booster for a universal mobile telecommunications system terrestrial radio access node B (eNB).

BACKGROUND

Small cells are low-powered radio access nodes that may operate as part of a wireless communication network, with an small cell operational range that may be on the order of 10 m to 1 km. Small cells may be compared with macrocells which may have a range greater than 10 km. of 10-50 km. MCSC are small cells that use millimeter electromagnetic waves, including waves with a frequency between 30 gigahertz and 300 gigahertz, for communication.

DETAILED DESCRIPTION

Embodiments relate to systems, methods, and computer readable media to enable a millimeter wave capable small cell (MCSC) devices or other small cell devices to receive a handover of a user equipment from a universal mobile telecommunications system terrestrial radio access node B (eNB.) In particular, systems and methods are described for user equipment (UE) association with a MCSC operating as a booster for an eNB, including identification of and communication on preferred cell sector between the UE and the MCSC. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In various implementations, a MCSC can work as a booster cell in an anchor-booster architecture, where the MCSC operating as a booster cell for an eNB offloads a portion of the traffic for a UE being managed by the eNB. MCSC operation as a booster cell supports highly efficient delivery of user traffic within the MCSC cell area that is a subset of the area covered by the eNB, and may enable signal quality assurance for UE during periods of high communication rates or in congested areas of eNB coverage. Such booster operation may provide particular benefits when a booster MCSC may be deployed in a different frequency band than the eNB frequency band due to relaxed interference between communication layers. An MCSC acting as a booster operating at millimeter wave frequencies may thus be a modular improvement to certain eNB systems if the UE operating within the eNB coverage area support millimeter wave frequencies. Alternatively, an MCSC can act as a secondary carrier where a backhaul communication link is directly available to the MCSC rather than as a booster. In both such implementations, the MCSC will be part of handover processes to manage UE communications as the UE moves.

Embodiments described herein related to signal quality measurements on a sector basis, association between a UE and an MCSC as part of a handover from an eNB, and coarse beamforming training. Additionally, embodiments further include a high level design of PSS/SSS and PRACH sequences which are customized for the handover of the UE between the eNB and the MCSC.

Figure 1:
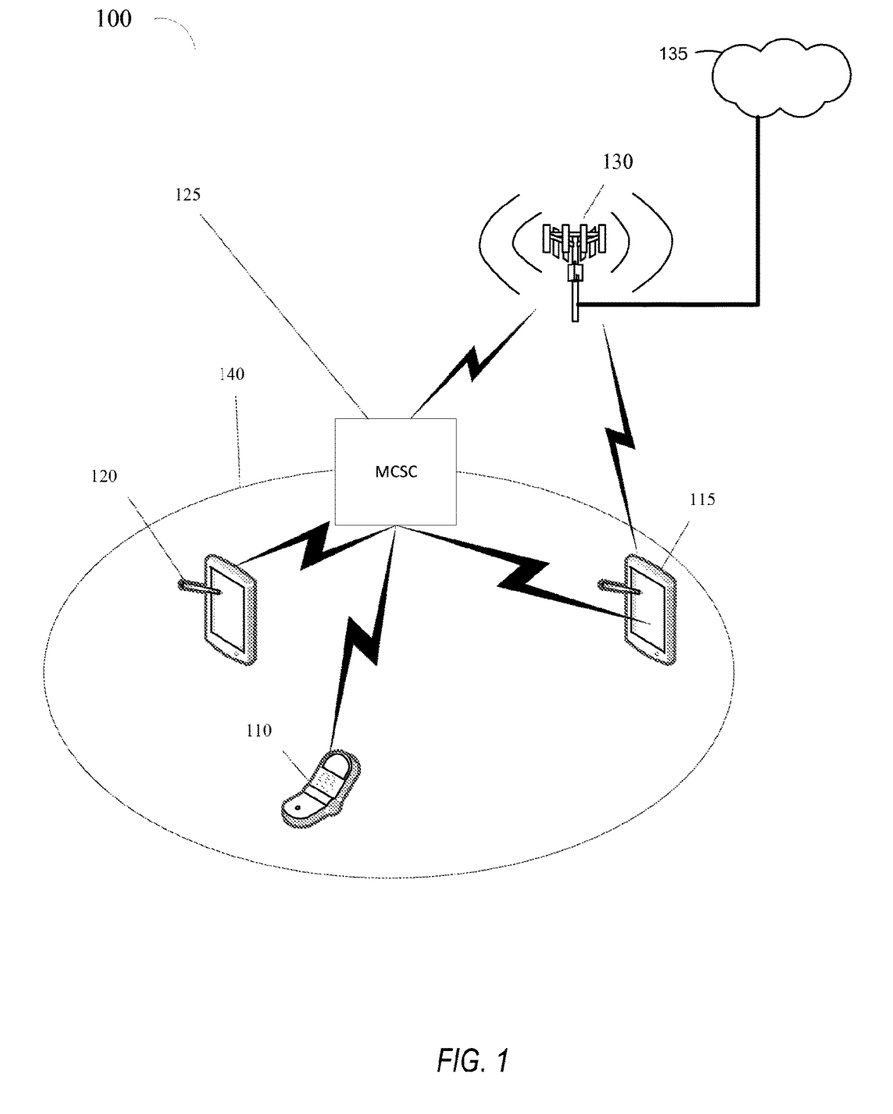
FIG. 1 illustrates a block diagram a network including an MCSC and an eNB in accordance with some embodiments.

FIG. 1 illustrates a wireless network 100 in accordance with some embodiments. The wireless network 100 includes user equipment (UE) 110, 115 and 120. The UEs 110, 115, and 120 may be, for example, laptop computers, smart phones, tablet computers, printers, machine-type devices such as smart meters, or any other wireless device with or without a user interface. In an example, the UEs 110, 115 and 120 have a wireless connection through a millimeter wave capable small cell 125, through universal mobile telecommunications system terrestrial radio access node B (eNB), or through both to the wireless network 135. The wireless network 135 may represent an interconnection of a number of networks. For instance, the wireless network 135 may couple with a wide area network such as the Internet or an intranet.

MCSC 125 provides communication support in a service area 140. Service area 140 is at least partially within an eNB service area provided by eNB 130. Service area 140 and the eNB service area associated with eNB 130 are each supported by antennas integrated with MCSC 125 and eNB 130 for their respective service areas. The service areas will be divided into a number of sectors associated with certain antennas. Such sectors may be physically associated with fixed antennas, or may be assigned to a physical area with tunable antennas or antenna settings adjustable in a beamforming process used to direct a signal to a particular sector. One embodiment of eNB 130, for example, includes three sectors each covering a 120 degree area with an array of antennas directed to each sector to provide 360 degree coverage around eNB 130.

MCSC 125, using millimeter wave signals may use antenna that are highly directional, and may thus use several different antennas which each cover a small directional arc from the location of the MCSC. The signals directed into such arcs may overlap to provide an acceptable quality level over a service area. While service area 140 is shown as a circle, in certain embodiments, MCSC 125 may be structured so that the sectors in service area 140 may not cover an area 360 degrees around the location of MCSC 125. MCSC 125 may thus be configured to support directional wireless links with multiple UE devices using millimeter wave communications. In certain embodiments, MCSC 125 may transmit to a UE such as UE 115 using a millimeter wave channel, and may receive communications back from UE 115 on a different channel. The return channel may be the same millimeter wave channel a different millimeter wave channel, or may be an omnidirectional communication or other communication not using a millimeter wave channel. In certain embodiments, physical blocking structures may create gaps in service area 140 or the eNB service area, and multiple MCSC may be placed in different positions such that the eNB service area, service area 140, and service areas associated with other MCSC will provide consistent signal coverage over a given area. In certain environments, such as multi-level buildings, this may include coverage at certain elevations in addition to ground level coverage which is represented two dimensionally by service area 140.

In certain environments, eNB 130 and MCSC 125 may additionally operate with other signal sources such as a wireless access point (AP) or a personal basic service set (PBSS) control point (PCP) which may further be used to provide consistent signal coverage.

Figure 2:
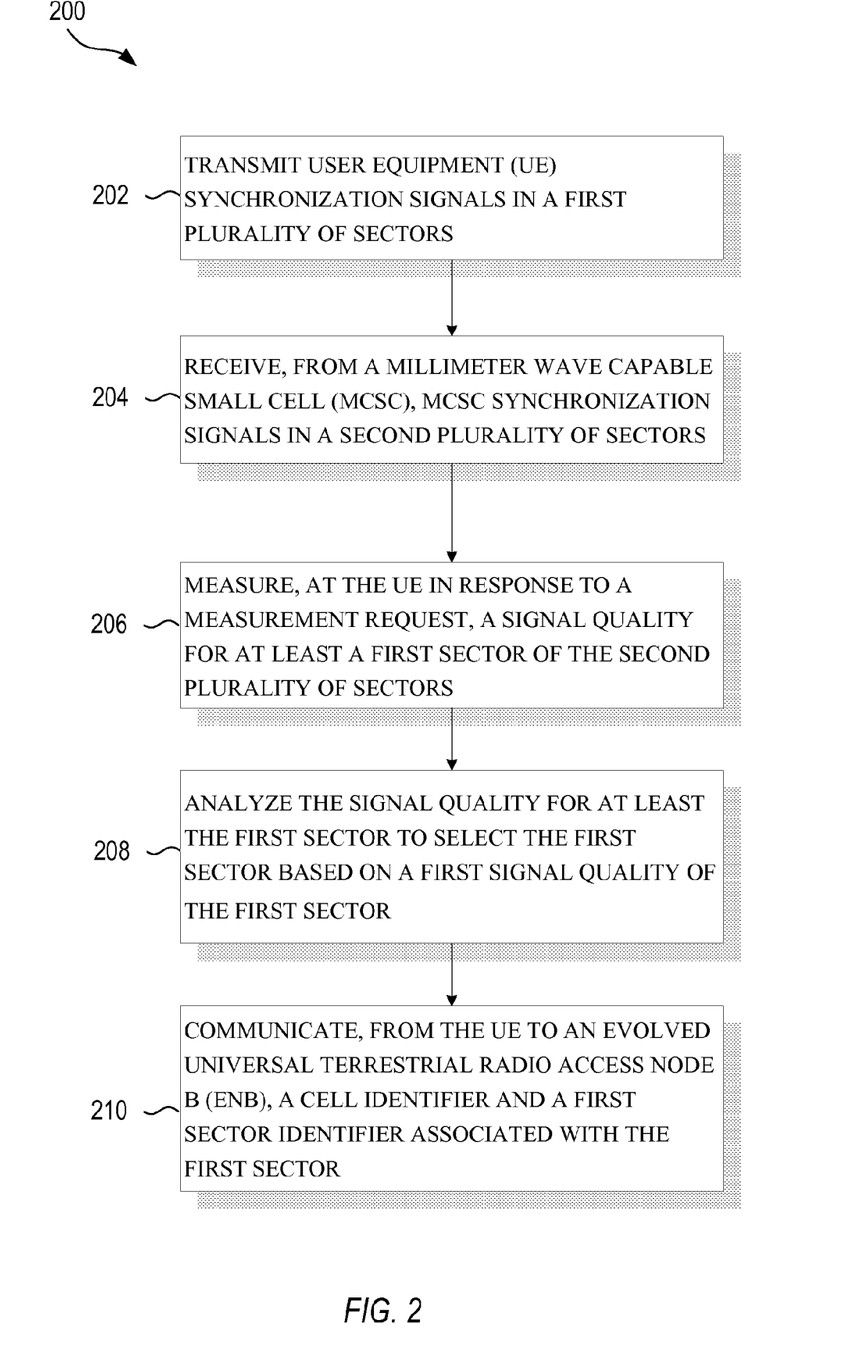
FIG. 2 shows a method for cell association and beamforming training with a MCSC in accordance with some embodiments.

FIG. 2 shows one example embodiment of a method for cell association and beamforming training with a MCSC, shown as method 200. While method 200 may be implemented with a variety of different systems, for illustrative purposes, method 200 is described below with respect to network 100 of FIG. 1. Additionally, while method 200 describes one example embodiment, it will be apparent that other embodiments are possible within the scope of the innovations described herein.

In operation 202, UE 115 transmits UE synchronization signals in a first plurality of sectors. Such sectors may be defined by antennas of UE 115 or any system or transmission configurations of UE 115. An example of UE synchronization signals sent in a plurality of sectors is shown by random access codes 434 of FIG. 4B, with each random access code 434a through 434n sent in a different sector.

In operation 204, UE 115 receives, from MCSC 125, MCSC synchronization signals in a second plurality of sectors. As described above, such sectors may be defined by antennas of MCSC 125 or any system or transmission configuration of MCSC 125. An example of MCSC synchronization signals sent in a plurality of sectors is shown by MCSC synchronization signals 404 of FIG. 4A, with each MCSC synchronization signal 404a through 404n sent in a different sector.

In operation 206, UE 115 measures in response to a measurement request, a signal quality for at least a first sector of the second plurality of sectors. Such a measurement request may be received at UE 115 from eNB 130, or from any other authorized source.

In operation 208, UE 115 analyzes the signal quality for at least the first sector to select the first sector based on a first signal quality of the first sector. In operation 210, UE 115 communicate, from the UE 115 eNB 130, a cell identifier and a first sector identifier associated with the first sector.

Additional embodiments may further operate where UE 115 receives, from the eNB, the measurement request prior to receipt of the MCSC synchronization signals in the second plurality of sectors, and where UE 115 determines, from the MCSC synchronization signals, a cell identifier associated with the MCSC 125 and a sector identifier associated with each sector of the second plurality of sectors.

Additional embodiments may further operate where each MCSC synchronization signal per sector of the second plurality of sectors comprises a primary synchronization signal (PSS) comprising two continuous symbols and a secondary synchronization signal (SSS) that follows the PSS.

Additional embodiments may further operate where the signal quality for each sector of the second plurality of sectors is based, at least in part, on at least one of a received signal strength indication (RSSI), a reference signal received power (RSRP), and a reference signal received quality (RSRQ) value of the first synchronization signal for each sector of the plurality of sectors.

Additional embodiments may further operate where UE 115 receives, from the eNB 130, a radio resource control (RRC) connection reconfiguration communication in response to communication of the cell identifier to the eNB.

Additional embodiments may further operate where the RRC connection reconfiguration communication comprises mobility control information and where the RRC connection reconfiguration communication is received in response to a handover communication between the eNB 130 and the MCSC 125.

Additional embodiments may further operate where analyzing the signal quality for at least the first sector of the plurality of sectors to select the first sector comprises determining a quality value for each sector of the plurality of sectors as a function the RSSI, the RSRP, and the RSRQ, determining a best quality value from the quality value for each sector of the plurality of sectors, and selecting a sector associated with the best quality value as the first sector.

Additional embodiments may further operate where the RRC connection reconfiguration is further received in response to a handover decision made by the eNB based on the first signal quality of the first sector.

Additional embodiments may further operate where UE 115 receives, from the eNB 130, the cell identifier, a master information block (MIB), and a set of physical random access channel (PRACH) codes via a physical shared downlink channel (PDSCH).

Additional embodiments may further operate where UE 115 periodically receives a retransmission of the synchronization signal from the MCSC 125 and performs a timing acquisition using the PSS.

Additional embodiments may further operate where UE 115 performs a reverse direction training at least in part by communicating, from the UE to the eNB, a PRACH code of the set of PRACH codes to each of the first plurality of sectors as part of transmission of the UE synchronization signal in the first plurality of sectors.

Additional embodiments may further operate where the set of PRACH codes comprises number of PRACH codes equal to a random access code base number times a number of sectors.

Additional embodiments may further operate where each PRACH code of the set of PRACH codes comprises a base PRACH code and sector identification information.

Additional embodiments may further operate where UE 115 receives at the UE, in response to the reverse direction training, a cell radio network temporary identifier (C-RNTI) and a timing advance (TA) command.

Another embodiment may be a method performed by UE 115 operating with an eNB 130 and MCSC 125. Such a method may involve receiving, at the UE 115 from the eNB 130, a measurement request, and receiving, at the UE 115 from the MCSC 125, an MCSC synchronization signal in each sector of a first plurality of sectors. Such a method may also involve determining, by the UE 115, a cell identifier associated with the MCSC 125 and a sector identifier associated with each sector, selecting a sector in response to the measurement request, and communicating, from the UE 115 to the eNB 125, the cell identifier and a first sector identifier associated with the selected sector.

Additional such embodiments may further operate where selecting the sector in response to the measurement request comprises measuring, at the UE 115 in response to the measurement request, a signal quality for each sector of the first plurality of sectors, and analyzing the signal quality for each sector of the first plurality of sectors to select a first sector based on a first signal quality of the first sector.

Additional such embodiments may further operate where the signal quality for each sector is a function of a received signal strength indication (RSSI), a reference signal received power (RSRP), and a reference signal received quality (RSRQ) value of the first synchronization signal for each sector of the first plurality of sectors.

Additional such embodiments may further involve receiving, at the UE from the eNB, a radio resource control (RRC) connection reconfiguration communication in response to communication of the cell identifier to the eNB, receiving, at the UE from the eNB, the cell identifier, a master information block (MIB), and a set of physical random access channel (PRACH) codes via a physical shared downlink channel (PDSCH), and performing a reverse direction training at least in part by communicating, from the UE to the eNB, a PRACH code of the set of PRACH codes for each sector of the first plurality of sectors. Such an embodiment may operate where the PRACH code comprises a base PRACH code, sector information for reverse direction training, and eNB sector information for beamforming training acknowledgement.

Additional such embodiments may further operate where the MCSC synchronization signal is received as part of a millimeter wave communication from the MCSC with a communication frequency between 59.9 GHz and 60.1 GHz. In other embodiments, any millimeter wave frequency may be used. In still further embodiments, both millimeter wave frequencies and non-millimeter wave frequencies may be used.

Additional embodiments, as detailed further below, may comprise non-transitory computer readable medium. In such an embodiment, the medium comprises instructions that, when executed by a processor, cause UE 115 to take certain actions. In one such example embodiment, the instructions cause the UE 115 receive, from eNB 130, a measurement request and receive, from MCSC 125 a MCSC synchronization signal in a second plurality of sectors. The instructions may further cause UE 115 to determine, a cell identifier associated with the MCSC 125 and a sector identifier associated with each sector of the second plurality of sectors. The instructions may still further cause UE 115 to measure, at the UE in response to the measurement request, a signal quality for each sector of the second plurality of sectors, to analyze the signal quality for each sector of the second plurality of sectors to select a first sector of the plurality of sectors based on a first signal quality of the first sector, and to communicate, from the UE to an evolved universal terrestrial radio access node B (eNB), a cell identifier and a first sector identifier associated with the first sector.

In further embodiments, the instructions may further cause the UE 115 to transmit a UE synchronization signal in a first plurality of sectors; receive, from the eNB 130, a radio resource control (RRC) connection reconfiguration communication in response to communication of the cell identifier to the eNB; and receive, from the eNB, the cell identifier, a master information block (MIB), and a set of physical random access channel (PRACH) codes via a physical shared downlink channel (PDSCH).

In still further embodiments, the instructions may further cause the UE 115 to periodically receive a retransmission of the MCSC synchronization signal from the MCSC 125, perform, by the UE 115, a timing acquisition using a primary synchronization signal (PSS) of the MCSC synchronization signal; perform a reverse direction training at least in part by communicating, from the UE 115 to the eNB 140, a PRACH code of the set of the PRACH codes as part of transmission of the UE synchronization signal in each sector of the first plurality of sectors; and receive, in response to the reverse direction training, a cell radio network temporary identifier (C-RNTI) and a timing advance (TA) command.

Figure 3:
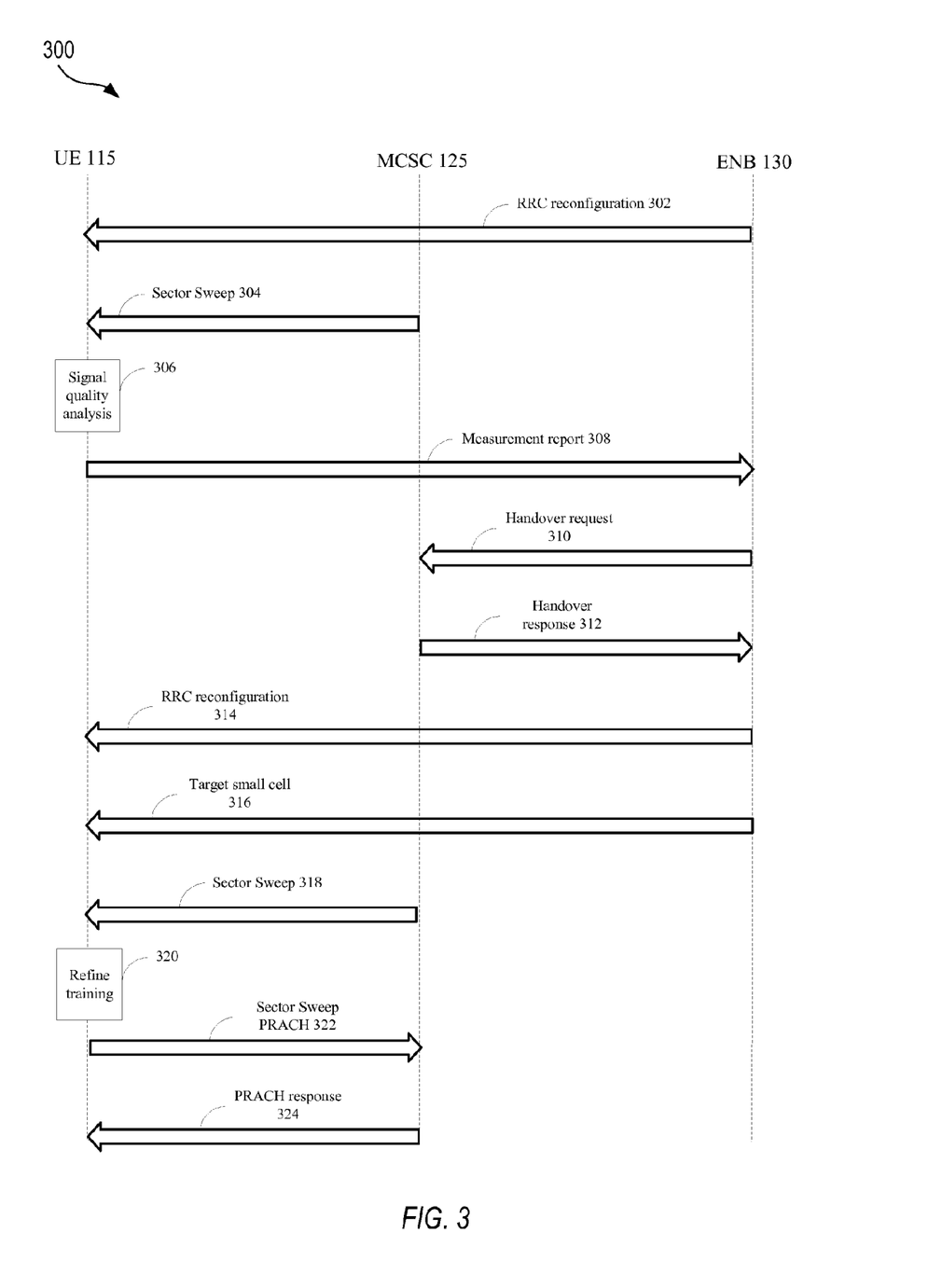
FIG. 3 shows another method for cell association and beamforming training with a MCSC in accordance with some embodiments.

FIG. 3 shows a flowchart of method 300 describing another embodiment of cell association and beamforming training with an MCSC. Just as above for method 200, while the operations of method 300 may be performed using various different systems, method 300 is particularly described using the elements of network 100 from FIG. 1. Method 300 shows a series of operations and communications between UE 115, MCSC 125, and eNB 130, with the operations proceeding from top to bottom. In alternative embodiments, any operation described herein may be performed simultaneously with similar operations being performed with other elements, such that MCSC 125 may communicate with other UE such as UE 110 or UE 120. ENB 130 may similarly communicate with MCSC 125 and with another different MCSC at the same time, such that a system may perform aspects of the operations described by method 300 at the same time.

Additionally, the embodiment below describes MCSC 125 operating as a booster cell, with the use of handover commands sent to MCSC 125 by eNB 130. In an alternate embodiment with an MCSC such as MCSC 125 working as a secondary carrier instead of a booster cell, the MCSC 125 of network 100 would include a direct connection to wireless network 135, similar to the connection shown between eNB 130 and wireless network 135. In such an embodiment with the MCSC 125 working as a secondary carrier, eNB 130 may use activation/de-activation procedures instead of handover procedures to enable a UE such as UE 115 to use MCSC 125 for wireless traffic.

Method 300 begins with an operation for radio resource control (RCC) reconfiguration 302, which functions as a measurement request made by eNB 130 and communicated to UE 115. In certain embodiments, this may be similar to a standard Long-Term Evolution (LTE) RCC reconfiguration using a "measConfig" operation.

Sector sweep 304 may be part a repeated operation that occurs continuously or periodically as part of a system setting. In one example, sector sweep 304 may be part of an operation that repeats every 5 milliseconds. In other embodiments, any other such periodic or system selected repetition may be used. Sector sweep 304 involves communication of MCSC synchronization signals from MCSC 125 that are received by UE 115. The synchronization signals may be sent in multiple sectors repeatedly.

Figure 4A:
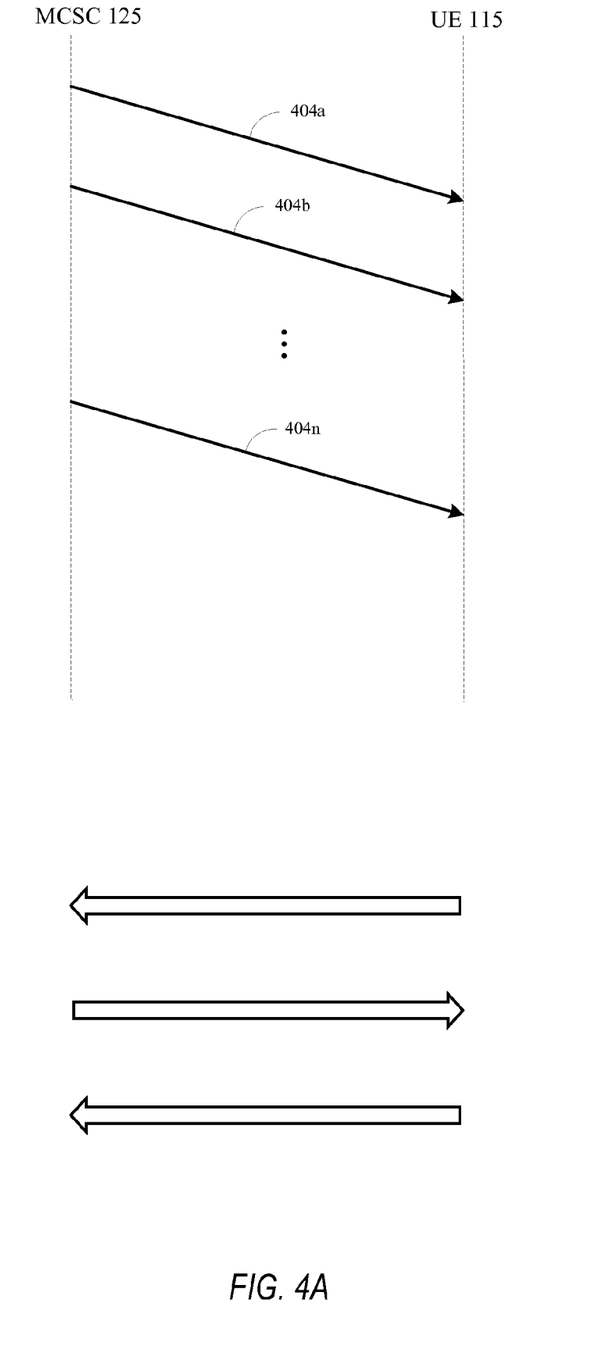
FIG. 4A illustrates communication of MCSC synchronization signals in a first plurality of sectors in accordance with some embodiments.

FIG. 4A describes aspects of one embodiment of MCSC synchronization signals 404 that are communicated to a plurality of sectors. Synchronization signals 404 includes a signal communicated to a first sector as synchronization signal 404a, to a second sector as synchronization signal 404b, to an Nth sector as synchronization signal 404n, and so on. Such signals may be received by UE 115, as well as by any other UE within a signal area covered by a synchronization signal sent to a particular sector. In certain embodiments, certain synchronization signals of synchronization signals 404 may not be received by UE 115 while at least one signal of synchronization signals 404 is received by UE 115.

In one embodiment comprising a frame structure, multiple continuous symbols may be used as part of the MCSC synchronization signals 404, with a primary synchronization signal (PSS) and a secondary synchronization signal (SSS). Such a system may operate using a PSS code space that is expanded from a standard three sector LTE code space to a multiple sector design. For example, and expanded PSS code space may include space for 8 sectors or 16 sectors. To enable efficient detection of the PSS, the PSS sequence within an individual synchronization signal of MCSC synchronization signals 404 may have an internally repetitive pattern.

For example, one embodiment of a PSS sequence may be placed at every odd tone or every even tone in a frequency domain, resulting in a time domain repetition and allowing auto-correlation for timing acquisition and frame boundary detection. Cross-correlation may then be applied by a detector to detect the sector identifier. The SSS, which includes the cell identifier, may follow a similar design with coherent detection enabled by the design of the SSS. The detailed sequence of PSS and SSS elements of a synchronization signal may be set based on the bandwidth of the MCSC system and the sampling rate and symbol duration of a system in which the MCSC 125 operates. Such a detailed sequence may also be set based on the number of sectors used by MCSC 125.

Figure 5:
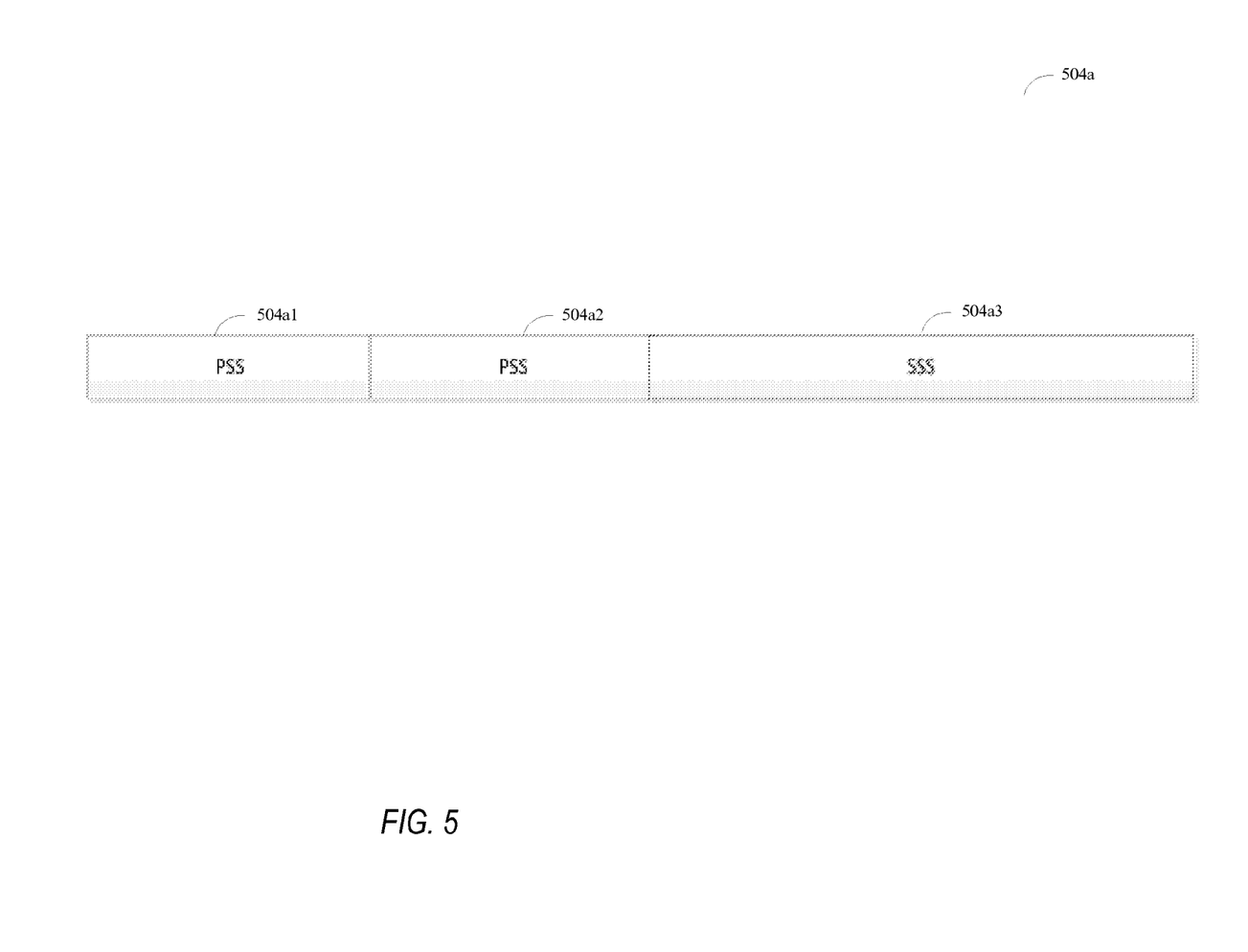
FIG. 5 illustrates one implementation of a synchronization signal in accordance with some embodiments.

FIG. 5 illustrates one embodiment of a MCSC synchronization signal 504a. In certain implementations of MCSC synchronization signals 404, MCSC synchronization signal 404a may be similar to MCSC synchronization signal 504a. MCSC synchronization signal 504a includes two PSS communications shown as first PSS 504a1 and second PSS 504a2. Second PSS 504a2 is followed by a single SSS 504a3. MCSC synchronization signal 504a may then be followed by a other MCSC synchronization signals as part of a sector sweep using MCSC synchronization signals with each MCSC synchronization signal having the two PSS/one SSS synchronization signal structure.

The operation for signal quality analysis 306 then includes reception of one or more MCSC synchronization signals 404 such as MCSC synchronization signal 404a, and performance of a signal quality analysis by UE 115 on each received MCSC synchronization signal. The signal quality may be based, at least in part, on a received signal strength indication (RSSI), a reference signal received power (RSRP), a reference signal received quality (RSRQ) value of the first synchronization signal for each sector of the plurality of sectors, or any combination of these or other values determined from the received MCSC synchronization signals 404. UE 115 then selects a sector based on the quality analysis. In one embodiment, for example, UE 115 may determine a quality value for each sector of the plurality of sectors as a function the RSSI, the RSRP, and the RSRQ, determine a best quality value from the quality value for each sector of the plurality of sectors, and select a sector associated with the best quality value as the first sector. This may, for example, be a largest or smallest quality value selected from the quality value for each sector.

Measurement report 308 then is an operation where UE 115 communicates the results of the quality analysis performed as part of signal quality analysis 306. Measurement report 308 may include quality numbers for each sector by, for example, sending an RSSI value, an RSRP value, and an RSRQ value for each sector. Measurement report 308 may alternatively send such values or another value such as a calculated quality value that is a function of such quality numbers.

ENB 130 may then receive the information from measurement report 308 and use this information to make a handover decision. This handover decision may be based on quality analysis thresholds, based on a comparison with similar quality analysis numbers associated with signals from eNB 130 to UE 115, or based on any other such handover decision thresholds. Such handover decisions may be based on existing LTE handover standards between eNBs, or may be based on handover processes customized for MCSC operations. Additionally the handover decisions may be different depending on whether MCSC 125 is operating as a booster for eNB 130, or whether MCSC 125 is operating as an independent cell.

When eNB 130 determines that UE 115 will be passed to MCSC 125 from eNB 130, eNB performs a handover hand shake with MCSC 125. This handover process as shown by method 300 includes a handover request 310 including a communication from eNB 130 to MCSC 125, a handover response 312 communication from MCSC 125, and an RRC reconfiguration 314 communication from eNB 130 to UE 115.

After this initial portion of the handover, target small cell 316 operation involves a communication of applicable handover information from eNB 130 to UE 115. This handover information includes a master information block (MIB), and a physical random access channel (PRACH) code via a physical shared downlink channel (PDSCH) or any available communication link. The handover information may also include system information blocks (SIB), the sector identified by signal quality analysis 306, and any other such handover information.

Sector sweep 318 is then a continuation of the transmission of MCSC synchronization signals 404 sent by MCSC 125. These additional repetitions of MCSC synchronization signals 404 may then be received by UE 115. Refine training 320 is then an operation performed by UE 115 to use the portion of the MCSC synchronization signals 404 received by UE 115 from sector sweep 318 to perform timing acquisition. The timing acquisition performed by UE 115 may use PSS portions of individual MCSC synchronization signals such as MCSC synchronization signal 404b along with the handover information received as part of target small cell 316. Refine training 320 may additional involve a repeat of the quality analysis of signal quality analysis 306 to determine if a new sector is associated with the best signal quality. In certain embodiments, if a UE is not moving and an elapsed time between sector sweep 304 and sector sweep 318 is small, UE 115 may determine that refine training 320 is not needed and refine training 320 may not be performed. This determination may be based on threshold setting stored in UE 115 and associated with the UE 115 movement and an elapsed time between receipt of MCSC synchronization signals in sector sweep 304 and sector sweep 318.

Figure 4B:
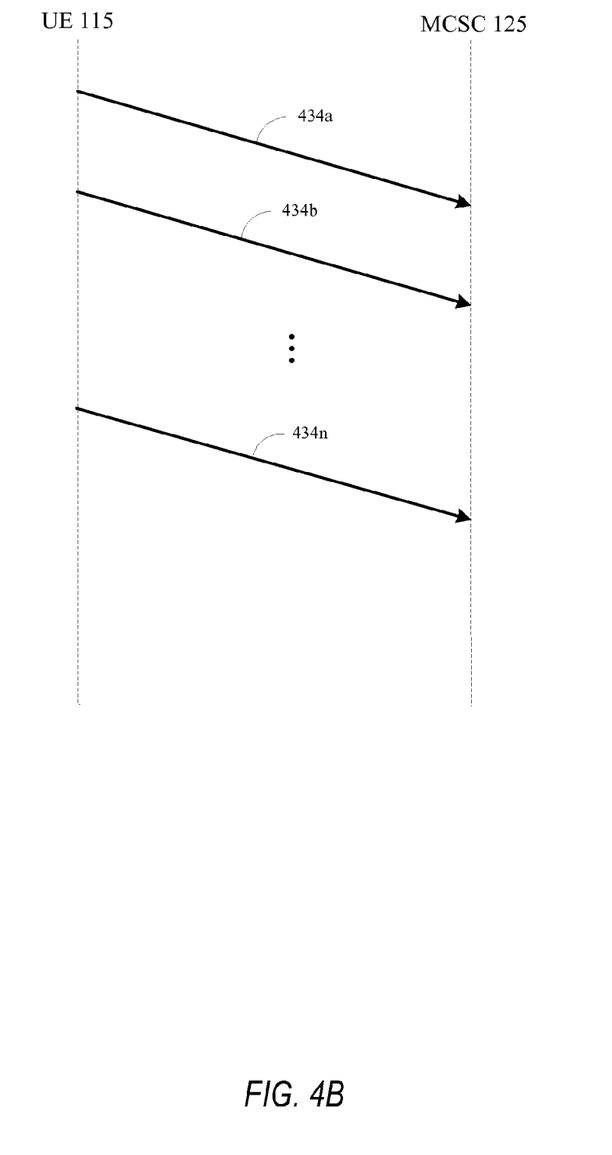
FIG. 4B illustrates communication of random access codes in a second plurality of sectors in accordance with some embodiments.
Figure 6A:
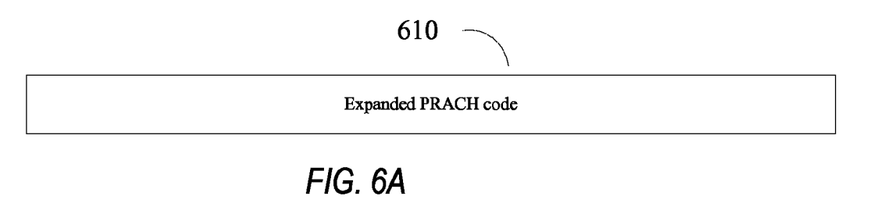
FIG. 6A illustrates one implementation of a random access code in accordance with some embodiments.
Figure 6B:
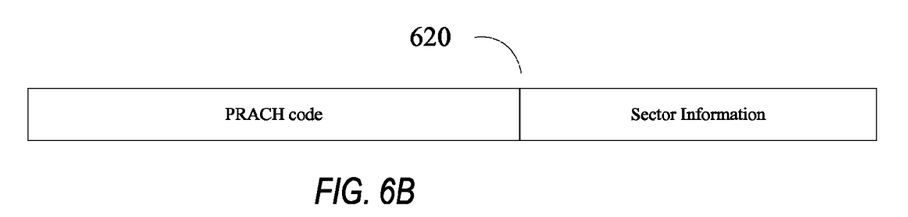
FIG. 6B illustrates another implementation of a random access code in accordance with some embodiments.
Figure 6C:
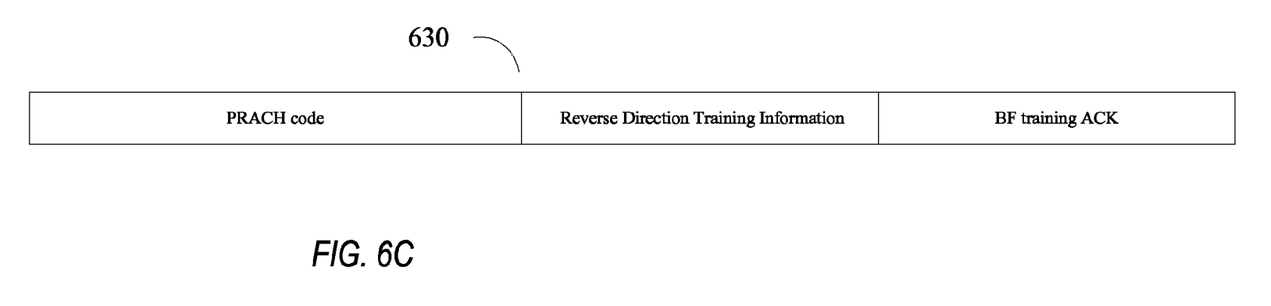
FIG. 6C illustrates another implementation of a random access code in accordance with some embodiments.

The operation for sector sweep PRACH 322 is then part of a reverse training from UE 115 to MCSC 125. As part of this reverse training, UE 115 sends the access codes received as part of handover information from the target small cell 316 operation. This includes an access code for each sector as shown by FIG. 4B, such that UE 115 sends a sector 1 random access code 434a, a sector two random access code 434b, a sector n random access code 434n, and so on. In various embodiments, this may be a PRACH code which may be modified from a standardized base of 64 random access codes in a variety of ways, as illustrated by FIGS. 6A-6C. FIG. 4B thus shows UE synchronization signals sent by UE 115 in a first plurality of sectors, where FIG. 4A shows MCSC synchronization signals sent in a separate second plurality of sectors.

FIG. 6A illustrates an example of an access code that may be used as part of sector sweep PRACH 322 as random access code 610. Random access code 610 one access code from a set of expanded PRACH codes, with the set comprising a number of codes equal to 64 codes times the number of sectors used by MCSC 125. For example, if MCSC 125 used 10 sectors, the set of expanded PRACH codes which random access code 610 is part of would include 640 different access codes. If MCSC 125 used 4 sectors, the set of expanded PRACH codes which random access code 610 is part of would include 256 different access codes.

FIGS. 6B and 6C additional examples of access codes that may be used as part of sector sweep PRACH 322. Random access code 620 includes a standard PRACH code followed by sector information. The set of PRACH codes of which random access code 620 is a part would include the same number of different random access codes as the set of PRACH codes that random access code 610 is part of, but would simply include the sector information as part of the code rather than 64 unique random codes for each sector. Random access code 630 is an example of sector information that may be included in a random access code when refine training 320 determines that a UE 115 has moved an a new best sector different from the best sector determined with signal quality analysis 306 is associated with the new UE position. Random access code 330 thus includes a sector instead of merely including sector identification information. Random access code 630 thus includes not only a PRACH code, but also reverse direction training information and beamforming training acknowledgment information.

After the UE 115 sector sweep PRACH 322 operation completes communication of random access codes 434 as illustrated by FIG. 4B, MCSC 125 sends a random access response including a cell radio network temporary identifier (C-RNTI) and a timing advance (TA) command as part of PRACH response 324. Additionally, MCSC 125 may analyze the random access codes 434 that were received by MCSC 125 from sector sweep PRACH 322, and MCSC 125 may determine a best sector based on the random access codes 434 communicated in different sectors. This may use a signal quality analysis performed by MCSC 125 that is similar or identical any sector analysis described above for signal quality analysis 306. This may also involve additional or alternative different analysis of the sectors used for random access codes 434.

As discussed above, method 300 is particularly directed to an embodiment with MCSC 125 operating as a booster for eNB 130. In an alternate embodiment with an MCSC such as MCSC 125 working as a secondary carrier instead of a booster cell, eNB 130 may use activation/de-activation procedures instead of handover procedures to enable a UE such as UE 115 to use MCSC 125 for wireless traffic. In such embodiments, handover request 310 and handover response 312 may be replaced or enhanced with activation and deactivation actions directed to MCSC 125, with MCSC 125 responsive to such activation and deactivation commands from eNB.

Figure 7:
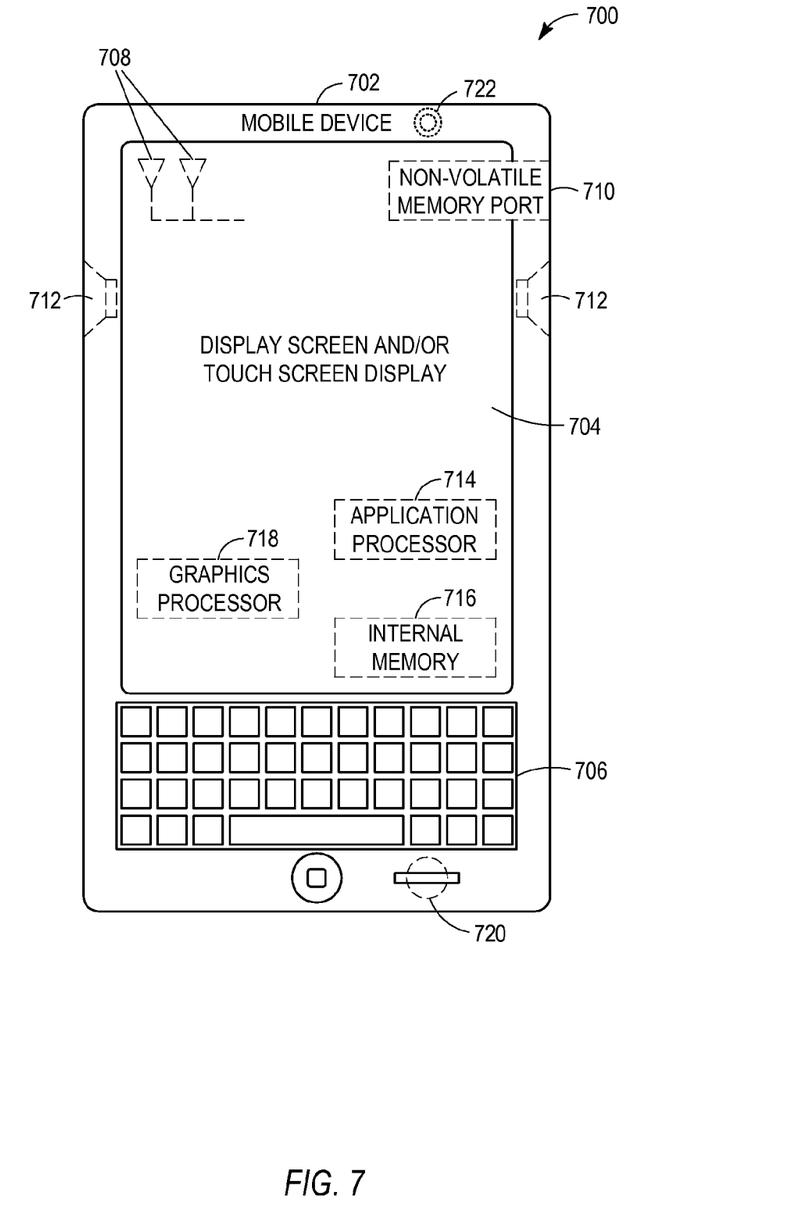
FIG. 7 illustrates an example of user equipment (UE) that may be used for cell association and beamforming training with an MCSC in accordance with some embodiments.

FIG. 7 shows an example UE, illustrated as UE 700. UE 700 may be an implementation of UE 110, UE 115, or any UE described herein, and may include circuitry configured to communicate with an MCSC such as MCSC 125 as well as circuitry to enable communication with an eNB such as eNB 130.

The UE 700 can include one or more antennas configured to communicate with transmission station, such as a base station (BS), an evolved Node B (eNB), a RRU, or other type of wireless wide area network (WWAN) access point. The mobile device can be configured to communicate using at least one wireless communication standard including 3GPP LTE. WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 illustrates an example of a UE 700. The UE 700 can be any mobile device, a mobile station (MS), a mobile wireless device, a mobile communication device, a tablet, a handset, or other type of mobile wireless computing device. The UE 700 can include one or more antennas 708 within housing 702 that are configured to communicate with a hotspot, base station (BS), an eNB, or other type of WLAN or WWAN access point. UE may thus communicate with a WAN such as the Internet via an eNB or base station transceiver implemented as part of an asymmetric RAN as detailed above. UE 700 can be configured to communicate using multiple wireless communication standards, including standards selected from 3GPP LTE, WiMAX, High Speed Packet Access (HSPA), Bluetooth, and Wi-Fi standard definitions. The UE 700 can communicate using separate antennas for each wireless communication standard or shared antennas for multiple wireless communication standards. The UE 700 can communicate in a WLAN, a WPAN, and/or a WWAN.

FIG. 7 also shows a microphone 720 and one or more speakers 712 that can be used for audio input and output from the UE 700. A display screen 704 can be a liquid crystal display (LCD) screen, or other type of display screen such as an organic light emitting diode (OLED) display. The display screen 704 can be configured as a touch screen. The touch screen can use capacitive, resistive, or another type of touch screen technology. An application processor 714 and a graphics processor 718 can be coupled to internal memory 716 to provide processing and display capabilities. A non-volatile memory port 710 can also be used to provide data input/output options to a user. The non-volatile memory port 710 can also be used to expand the memory capabilities of the UE 700. A keyboard 706 can be integrated with the UE 700 or wirelessly connected to the UE 700 to provide additional user input. A virtual keyboard can also be provided using the touch screen. A camera 722 located on the front (display screen) side or the rear side of the UE 700 can also be integrated into the housing 702 of the UE 700. Any such elements may be used to generate information that may be communicated as uplink data via an asymmetric C-RAN and to receive information that may be communicated as downlink data via an asymmetric C-RAN as described herein.

Figure 8:
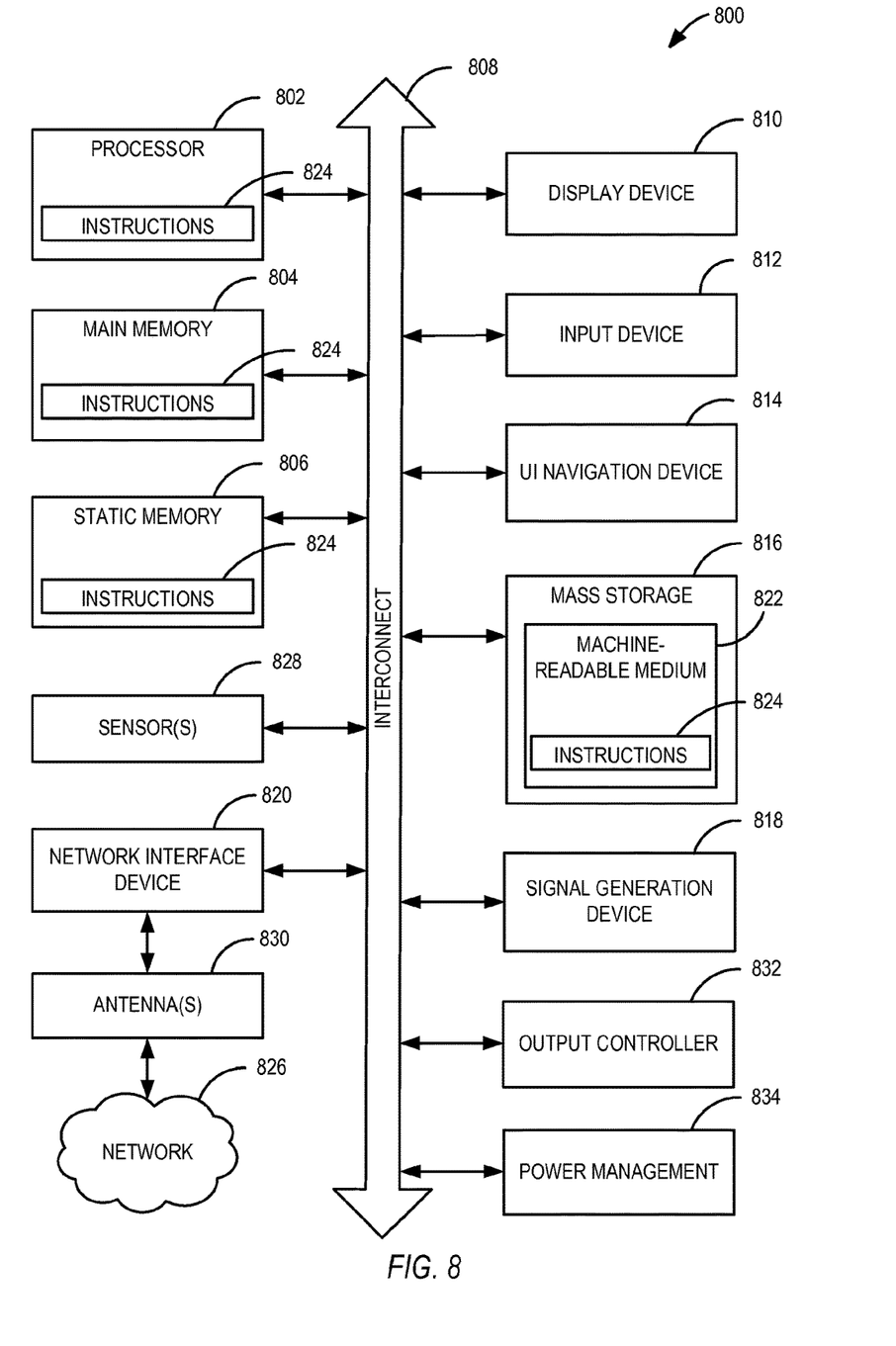
FIG. 8 is a block diagram illustrating an example computer system machine upon which any one or more of the methodologies herein discussed can be run, in accordance with some embodiments.

FIG. 8 is a block diagram illustrating an example computer system machine 800 upon which any one or more of the methodologies herein discussed can be run, including MCSC 125, eNB 130, and UE 115. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system machine 800 can further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system machine 800 can additionally include a storage device 816 (e.g., a drive unit), a signal generation device 818 (e.g., a speaker), an output controller 832, a power management controller 834, and a network interface device 820 (which can include or operably communicate with one or more antennas 830, transceivers, or other wireless communications hardware), and one or more sensors 828, such as a Global Positioning Sensor (GPS) sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor 802 during execution thereof by the computer system machine 800, with the main memory 804, static memory 806, and the processor 802 also constituting machine-readable media.

While the machine-readable medium 822 is illustrated in an example embodiment to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 824 can further be transmitted or received over a communications network 826 using a transmission medium via the network interface device 820 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

Various techniques, or certain aspects or portions thereof may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 802.11, and Bluetooth communication standards. Various alternative embodiments may use a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 7.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

What is claimed is:

1. An apparatus of a user equipment (UE) for beamforming training with a millimeter wave capable small cell (MCSC), the apparatus comprising circuitry configured to:
   initiate transmission of UE synchronization signals in a first plurality of sectors;
   process MCSC synchronization signals received from the MCSC in a second plurality of sectors;
   measure, at the UE in response to a measurement request, a signal quality for at least a first sector of the second plurality of sectors;
   analyze the signal quality for at least the first sector to select the first sector based on a first signal quality of the first sector; and
   initiate communication, from the UE to an evolved universal terrestrial radio access node B (eNB) separate from the MCSC, of a cell identifier and a first sector identifier associated with the first sector.

2. The apparatus of the UE of claim 1 wherein the circuitry is further configured to:
   receive, from the eNB, the measurement request prior to receipt of the MCSC synchronization signals in the second plurality of sectors; and
   determine, from the MCSC synchronization signals, a cell identifier associated with the MCSC and a sector identifier associated with each sector of the second plurality of sectors.

3. The apparatus of the UE of claim 2 wherein each MCSC synchronization signal per sector of the second plurality of sectors comprises a primary synchronization signal (PSS) comprising two continuous symbols and a secondary synchronization signal (SSS) that follows the PSS.

4. The apparatus of the UE of claim 3 wherein the signal quality for each sector of the second plurality of sectors is based, at least in part, on at least one of a received signal strength indication (RSSI), a reference signal received power (RSRP), and a reference signal received quality (RSRQ) value of the first synchronization signal for each sector of the plurality of sectors.

5. The apparatus of the UE of claim 4 wherein the circuitry is further configured to:
   receive, from the eNB, a radio resource control (RRC) connection reconfiguration communication in response to communication of the cell identifier to the eNB.

6. The apparatus of the UE of claim 5 wherein the RRC connection reconfiguration communication comprises mobility control information; and
   wherein the RRC connection reconfiguration communication is received in response to a handover communication between the eNB and the MCSC.

7. The apparatus of the UE of claim 5 wherein the circuitry configured to analyze the signal quality for at least the first sector of the plurality of sectors to select the first sector comprises circuitry configured to:

determine a quality value for each sector of the plurality of sectors as a function the RSSI, the RSRP, and the RSRQ;

determine a best quality value from the quality value for each sector of the plurality of sectors; and select a sector associated with the best quality value as the first sector.

8. The apparatus of the UE of claim 7 wherein the RRC connection reconfiguration is further received in response to a handover decision made by the eNB based on the first signal quality of the first sector.

9. The apparatus of the UE of claim 8 wherein the circuitry is further configured to:

receive, from the eNB, the cell identifier, a master information block (MIB), and a set of physical random access channel (PRACH) codes via a physical shared downlink channel (PDSCH).

10. The apparatus of the UE of claim 9 wherein the circuitry is further configured to:

periodically receive a retransmission of the synchronization signal from the MCSC; and perform, by the UE, a timing acquisition using the PSS.

11. The apparatus of the UE of claim 9 wherein the circuitry is further configured to:

perform a reverse direction training at least in part by communicating, from the UE to the eNB, a PRACH code of the set of PRACH codes to each of the first plurality of sectors as part of transmission of the UE synchronization signal in the first plurality of sectors.

12. The apparatus of the UE of claim 11 wherein the set of PRACH codes comprises number of PRACH codes equal to a random access code base number times a number of sectors.

13. The apparatus of the UE of claim 11 wherein each PRACH code of the set of PRACH codes comprises a base PRACH code and sector identification information.

14. The apparatus of the UE of claim 11 wherein the circuitry is further configured to:

receive at the UE, in response to the reverse direction training, a cell radio network temporary identifier (C-RNTI) and a timing advance (TA) command.

15. The apparatus of the UE of claim 1 further comprising one or more antennas configured to transmit the cell identifier to the eNB.

16. A method performed by a user equipment (UE) operating with an evolved node B (eNB) and a millimeter wave capable small cell (MCSC), the method comprising:

receiving, at the UE from the eNB, a measurement request;

receiving, at the UE from the MCSC, an MCSC synchronization signal in each sector of a first plurality of sectors;

determining, by the UE, a cell identifier associated with the MCSC and a sector identifier associated with each sector;

selecting a sector in response to the measurement request; and communicating, from the UE to the eNB, the cell identifier and a first sector identifier associated with the selected sector.

17. The method of claim 16 wherein selecting the sector in response to the measurement request comprises:

measuring, at the UE in response to the measurement request, a signal quality for each sector of the first plurality of sectors; and analyzing the signal quality for each sector of the first plurality of sectors to select a first sector based on a first signal quality of the first sector.

18. The method of claim 17 wherein the signal quality for each sector is a function of a received signal strength indication (RSSI), a reference signal received power (RSRP), and a reference signal received quality (RSRQ) value of the first synchronization signal for each sector of the first plurality of sectors.

19. The method of claim 17 further comprising:

receiving, at the UE from the eNB, a radio resource control (RRC) connection reconfiguration communication in response to communication of the cell identifier to the eNB;

receiving, at the UE from the eNB, the cell identifier, a master information block (MIB), and a set of physical random access channel (PRACH) codes via a physical shared downlink channel (PDSCH); and performing a reverse direction training at least in part by communicating, from the UE to the eNB, a PRACH code of the set of PRACH codes for each sector of a second plurality of sectors;

wherein the PRACH code comprises a base PRACH code, sector information for reverse direction training, and eNB sector information for beamforming training acknowledgement.

20. The method of claim 17 wherein the MCSC synchronization signal is received as part of a millimeter wave communication from the MCSC with a communication frequency between 59.9 GHz and 60.1 GHz.

21. A non-transitory computer readable medium comprising instructions that, when executed by a processor, cause a user equipment (UE) to:

receive, from an evolved node B (eNB), a measurement request;

receive, from a millimeter wave capable small cell (MCSC), a MCSC synchronization signal in each sector of a second plurality of sectors;

determine, by the UE, a cell identifier associated with the MCSC and a sector identifier associated with each sector of the second plurality of sectors;

measure, at the UE in response to the measurement request, a signal quality for each sector of the second plurality of sectors;

analyze the signal quality for each sector of the second plurality of sectors to select a first sector of the plurality of sectors based on a first signal quality of the first sector; and communicate, from the UE to an evolved universal terrestrial radio access node B (eNB), a cell identifier and a first sector identifier associated with the first sector.

22. The non-transitory computer readable medium of claim 21 wherein the instructions further cause the UE to:

transmit a UE synchronization signal in a first plurality of sectors;

receive, from the eNB, a radio resource control (RRC) connection reconfiguration communication in response to communication of the cell identifier to the eNB; and receive, from the eNB, the cell identifier, a master information block (MIB), and a set of physical random access channel (PRACH) codes via a physical shared downlink channel (PDSCH).

23. The non-transitory computer readable medium of claim 22 wherein the instructions further cause the UE to:

periodically receive a retransmission of the MCSC synchronization signal from the MCSC;

perform, by the UE, a timing acquisition using a primary synchronization signal (PSS) of the MCSC synchronization signal;
perform a reverse direction training at least in part by communicating, from the UE to the eNB, a PRACH code of the set of the PRACH codes as part of transmission of the UE synchronization signal in each sector of the first plurality of sectors; and
receive, in response to the reverse direction training, a cell radio network temporary identifier (C-RNTI) and a timing advance (TA) command.

\* \* \* \* \*